United States Patent
Rothman et al.

(10) Patent No.: US 7,716,464 B2
(45) Date of Patent: May 11, 2010

(54) METHOD TO HAVE FAULT RESILIENT BOOTING

(75) Inventors: Michael A. Rothman, Payallup, WA (US); Robert C. Swanson, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 11/166,687

(22) Filed: Jun. 23, 2005

(65) Prior Publication Data

US 2006/0294353 A1 Dec. 28, 2006

(51) Int. Cl.
*G06F 9/00* (2006.01)
*G06F 15/177* (2006.01)

(52) U.S. Cl. .......................................................... 713/2
(58) Field of Classification Search ............... 713/1, 713/2, 100
See application file for complete search history.

(56) References Cited

U.S. PATENT DOCUMENTS

| | | | | |
|---|---|---|---|---|
| 5,790,850 A * | 8/1998 | Natu | ................... | 713/2 |
| 5,809,330 A * | 9/1998 | Ninomiya | ................... | 710/9 |
| 5,819,107 A * | 10/1998 | Lichtman et al. | ................... | 710/8 |
| 5,974,546 A * | 10/1999 | Anderson | ................... | 713/2 |
| 6,003,097 A * | 12/1999 | Richman et al. | ................... | 710/8 |
| 6,122,735 A * | 9/2000 | Steiert et al. | ................... | 713/2 |
| 6,272,626 B1 * | 8/2001 | Cobbett | ................... | 713/2 |
| 6,336,152 B1 * | 1/2002 | Richman et al. | ................... | 710/8 |
| 6,393,559 B1 * | 5/2002 | Alexander | ................... | 713/2 |
| 6,449,735 B1 * | 9/2002 | Edwards et al. | ................... | 714/25 |
| 6,457,069 B1 * | 9/2002 | Stanley | ................... | 710/8 |
| 6,567,912 B1 * | 5/2003 | Belkin et al. | ................... | 713/2 |
| 6,601,167 B1 * | 7/2003 | Gibson et al. | ................... | 713/2 |
| 6,651,188 B2 * | 11/2003 | Harding et al. | ................... | 714/38 |
| 6,763,454 B2 * | 7/2004 | Wilson et al. | ................... | 713/1 |
| 6,807,643 B2 * | 10/2004 | Eckardt et al. | ................... | 714/36 |
| 6,873,333 B1 * | 3/2005 | Patel et al. | ................... | 345/530 |
| 6,925,557 B2 * | 8/2005 | Cromer et al. | ................... | 713/2 |
| 6,990,576 B2 * | 1/2006 | Qureshi et al. | ................... | 713/2 |
| 7,251,723 B2 * | 7/2007 | Lam | ................... | 713/1 |
| 7,424,623 B2 * | 9/2008 | Du et al. | ................... | 713/300 |
| 2004/0230788 A1 | 11/2004 | Zimmer et al. | | |
| 2006/0075274 A1 | 4/2006 | Zimmer et al. | | |
| 2006/0136713 A1 | 6/2006 | Zimmer et al. | | |
| 2006/0143431 A1 | 6/2006 | Rothman et al. | | |

(Continued)

OTHER PUBLICATIONS

Rothman, et al., U.S. Appl No. 10/364,994, filed Feb. 12, 2003.

(Continued)

*Primary Examiner*—Thomas Lee
*Assistant Examiner*—Mohammed H Rehman
(74) *Attorney, Agent, or Firm*—David P. McAbee

(57) ABSTRACT

A method and apparatus is described herein for fault resilient booting of a platform. Upon booting the platform, any boot routines marked are skipped. A current boot routine to be executed in a boot sequence is registered in nonvolatile memory. An attempt to execute the current boot routine is made. If the attempt is successful, the next boot entry is determined and skipped or executed, based on whether it is marked. However, if the execution fails the current boot routine is marked and, upon subsequent execution of the boot sequence, skipped.

20 Claims, 5 Drawing Sheets

U.S. PATENT DOCUMENTS

2006/0143432 A1 6/2006 Rothman et al.
2006/0143602 A1 6/2006 Rothman et al.
2006/0149959 A1 7/2006 Rothman et al.

OTHER PUBLICATIONS

Zimmer, et al., U.S. Appl. No. 11/110,504, filed Apr. 20, 2005.

* cited by examiner

METHOD TO HAVE FAULT RESILIENT BOOTING

FIELD

This invention relates to the field of computer systems, and in particular, to booting a computer system.

BACKGROUND

As computers advance, integration of platforms and their components become a larger and more complex task. Designers of computer systems prefer platforms to be modular and upgradeable, so pieces of the platform may be updated without having to replace the whole system. In light of this industry model, there are countless add-in cards, components, and modules that are connected to a system at any given time.

Unfortunately, designers do not have the capacity to test every combination of components in a system. Therefore, it is not uncommon, upon booting a system, to run into an unconventional setup that was not anticipated in the test phase, which results in unpredictable behavior in the system. This system behavior, in many instances, leads to a system hang or an improperly configured platform.

Unfortunately, in a platform boot environment, unlike starting and operating system (OS), if the system hangs there currently is no process to recover the system. In fact, many times the user is left only with calling the manufacturer or carrying the system into a dealer for service.

Some systems attempt to recover from numerous hangs in the boot sequence, by resetting factory defaults. However, if a newly placed component, such as an add-in card or memory, is causing the system to hang, resetting the defaults will not change the result. Furthermore, the user is not able to gather any information about what is causing the system to crash, and will have to rely on a service call to fix the problem.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as specific types of memory, specific marking techniques, and specific types of boot routines in order to provide a thorough understanding of the present invention. It will be apparent, however, to one skilled in the art that these specific details need not be employed to practice the present invention. In other instances, well known components or methods, such well-known flash design and specific architectures/instructions, etc., have not been described in detail in order to avoid unnecessarily obscuring the present invention.

Figure 1:
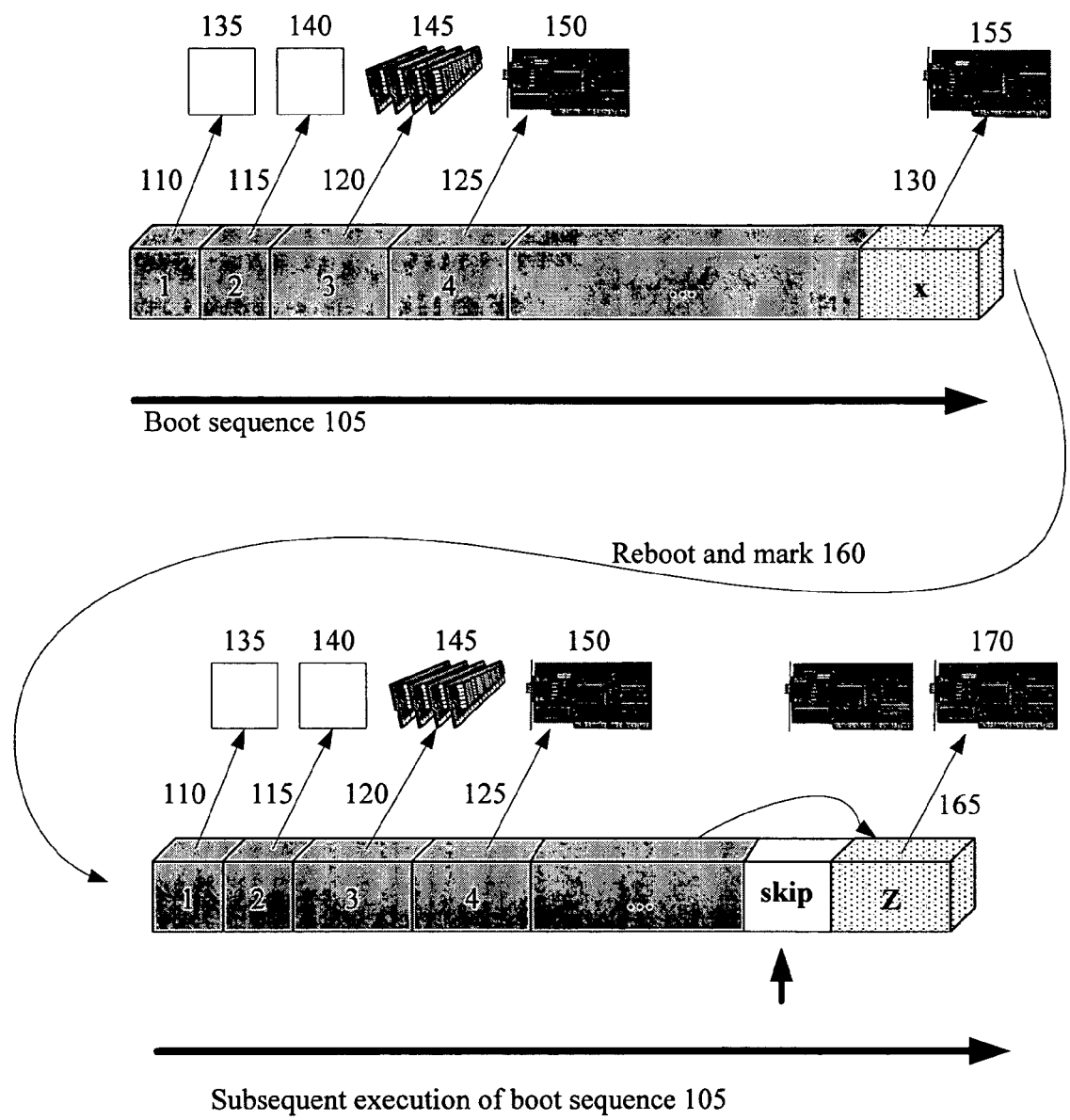
FIG. 1 illustrates an embodiment a boot sequence failing upon a first execution, and upon a subsequent execution the boot routine that failed during the first execution is skipped.

FIG. 1 illustrates an embodiment of a boot sequence failing upon a first execution, and upon a subsequent execution, skipping the boot routine that resulted in the failure during the first execution. A boot sequence typically refers to the process of initializing a platform, where a platform may be a computer system, an embedded system, or any other system requiring component initialization before operating software is loaded. As one example a boot sequence is a pre-boot, i.e. prior to an operating system boot, which initializes the components of the platform.

Platforms today use a basic input/output system (BIOS) stored in memory to boot. The BIOS code is stored in non-volatile memory or flash memory device for efficient booting and resiliency from disk failures. Code executed in the boot sequence to initialize or detect components within the system is referred to as a boot routine or boot entry. In fact, a boot sequence is typically comprised of a plurality of boot routines to be executed serially. As a specific example, an execute in place (XIP) architecture is used during boot. In an XIP architecture, physical memory locations are accessed directly and executed, without a virtual to linear address translation or use of a lookup table. Therefore, upon boot, a processing element executes the instructions or code, which in groups form boot routines, blindly and in serial, initializing device after device throughout the boot sequence.

Examples of common boot routines in a boot sequence include code to initialize a device or component such as an embedded controller, a processor, a processing element, a co-processor, a digital signal processor, a controller hub, a memory device, an add-in card, a sound device, a graphics device, a video device, a network device, a bus device, an interconnect bridge, a data storage device, an input device, an output device, a removable media device, and an externally coupled device. FIG. 1 illustrates boot sequence 105 initializing controllers 135 and 140, memory 145, and add-in cards 150 and 155. Detailed examples of boot routines include enumerating a device sitting across a communication streaming architecture (CSA) bridge, initializing memory or some other device, or initializing/loading operating system software.

A failure during execution of a boot routine may take a number of forms, including a recoverable and an unrecoverable failure. In one embodiment, a recoverable failure of a boot routine is where a boot routine attempts, but fails, to correctly initialize a device, and is able to either recover or report back that the device was not correctly initialized. In this instance, the boot sequence may be able to persist and the platform continues to be initialized. As a specific example, a boot routine to initialize an input device, such as a mouse, fails because the mouse is not connected properly or is defective. However, the boot sequence is able to detect no mouse and continue initialization without hanging.

In contrast, an unrecoverable failure results in a system hang or reboot, as execution of the boot sequence was not be completed. Often during a boot sequence, a watchdog timer is used to ensure the execution of each boot routine is proceeding. Therefore, the watchdog timer is set and upon completion of executing a boot routine the watchdog timer is reset to count down again. If a boot routine fails or hangs during execution, upon expiration of the watchdog timer, a system hang, reboot, or failure occurs. However, since the watchdog timer has expired and the system requires a reboot to begin the boot sequence again, some indication of the boot routine that was being executed during the failure is kept.

One example of such an indication includes marking a boot routine, if the boot routine failed during the first execution. Much like the type of failures, marking may take many forms.

In one embodiment, when a recoverable failure occurs during execution of a boot routine, the boot routine is marked at the time it is discovered that the boot routine failed.

In another embodiment, when an unrecoverable failure occurs, the boot routine that failed during the first execution is marked upon subsequent execution of the boot sequence. However, to be able to determine which boot routine failed upon a reboot or re-execution of the boot sequence, some reference to the boot routine that was being executed must be kept in a static memory that will not be wiped upon a reboot.

As one example, before executing a boot routine, a reference to the boot routine to be executed is stored in a currently executed field within a non-volatile memory. Therefore, if the boot routine to be executed includes initialization of memory, a reference to that boot routine is stored in a non volatile memory. If during initialization of memory a system hang occurs, upon reboot the currently executed field is read. From that field it is determined that the boot routine to initialize memory failed, since the currently executed field indicates that the failure occurred during initialization of the memory.

A reference to a boot routine stored in the currently executed field references a boot routine in any manner. For example, a reference to a boot routine includes storing the starting address and size of the boot routine. A reference also may include flagging a bit before or after the boot routine in a non-volatile memory to indicate that it was the last executed boot routine. As another example, a reference to a boot routine includes registering the routine information in a nonvolatile memory.

In one embodiment the nonvolatile memory is the flash memory used to store BIOS code. In another embodiment, the nonvolatile memory is a separate read only memory (ROM) device. However, the nonvolatile memory may be any memory device that retains its storage contents and state after a reboot, such as a random access memory (RAM) device with a battery backup.

Additionally, predefined platform policy may be used to decide whether a routine is marked and skipped upon a subsequent execution. For example, if initialization of memory fails, even if the system was able to persist in initializing the rest of the platform, the platform likely would not be able to operate without memory. In one embodiment, a boot routine is marked only if a boot routine fails during a first execution and the boot routine is not an essential boot routine.

As a specific illustrative example, upon first execution of a boot sequence, the boot routine to initialize a network card, referred to as the network boot routine, is the current boot routine to be executed. A reference to the network boot routine is stored in the currently executed field of the nonvolatile memory. Assuming a failure occurs upon execution of the network boot routine, a system hang occurs and a reboot is required. Upon subsequent execution, i.e. the reboot, the nonvolatile memory is checked and it is determined that the network boot routine failed during the first execution.

At this point, one option would be to mark the network boot routine. Another option is to determine whether the network boot routine is an essential boot routine according to platform policy. If it is an essential boot routine, the network boot routine is not marked, as the system cannot operate correctly without initialization of the device. Assuming in this example that the network boot routine is not essential, the boot routine is marked. Upon executing the boot sequence, any marked routines, such as the network boot routine, is skipped to ensure a system hang does not occur again from an attempt to initialize a non-essential device.

Moreover, the user may want to know what the problem was or what boot routines are being skipped. In one instance, the user is informed when a boot routine fails, is marked, or is not marked because it is essential. In another circumstance, the user is informed when a boot routine is skipped. Continuing the example from above, when it was determined upon reboot that the network boot routine failed, the user is informed that the network card was not initialized. Furthermore, if the network boot routine was determined essential and not marked, before the system attempts to initialize the network card again the user is informed of the attempt. Basically in this situation, the user is being informed that a system hang may occur in another attempt to initialize the network card. In contrast, if the boot routine was not essential, then upon skipping the boot routine, the user may be informed that the initialization of the network card is being skipped, i.e. there will be no network access if the platform boots.

So far, marking of a boot routine has only been discussed in reference to a first failure of a boot routine, however, marking is not so limited. Based on platform and designer policy, it may be advantageous to attempt initialization of a failed boot routine a number of times before marking and skipping it upon a subsequent execution. The number of times a boot routine failed may be kept in consecutive failures or non-consecutive previous failures. Continuing the network boot routine example from above, platform policy may require a boot routine to fail (N) times before marking it to be skipped. In the example above, the network boot routine would have failed (N−1) times without being marked before the first execution. Then, on the first execution of the boot sequence, the Nth failure occurs and the network boot routine is marked.

To use specific numbers as an illustration, platform policy does not mark a failed boot routine until the $3^{rd}$ failure. So, the network boot routine is assumed to have failed twice (N−1) times before the first execution of the boot sequence. On the first execution, the network boot routine fails again, i.e. the Nth time, and the network boot routine is marked. Keeping track of the number of times a boot routine has failed may include tracking a count variable or a certain number of bits in the nonvolatile memory. Every time a failure occurs the count variable is incremented/decremented or the bits are reconfigured.

As stated above, when executing the boot sequence, if a boot routine is marked, it is skipped upon subsequent execution. When determining the current routine to be executed, the current routine is checked to see if it is marked. If the routine is marked, then it is skipped without having to register it in the nonvolatile memory. The user may be informed both that a routine is being skipped and which boot routine, specifically, is being skipped. The actual skipping of a boot routine is discussed in more detail in reference to FIGS. 4 and 5.

Figure 2:
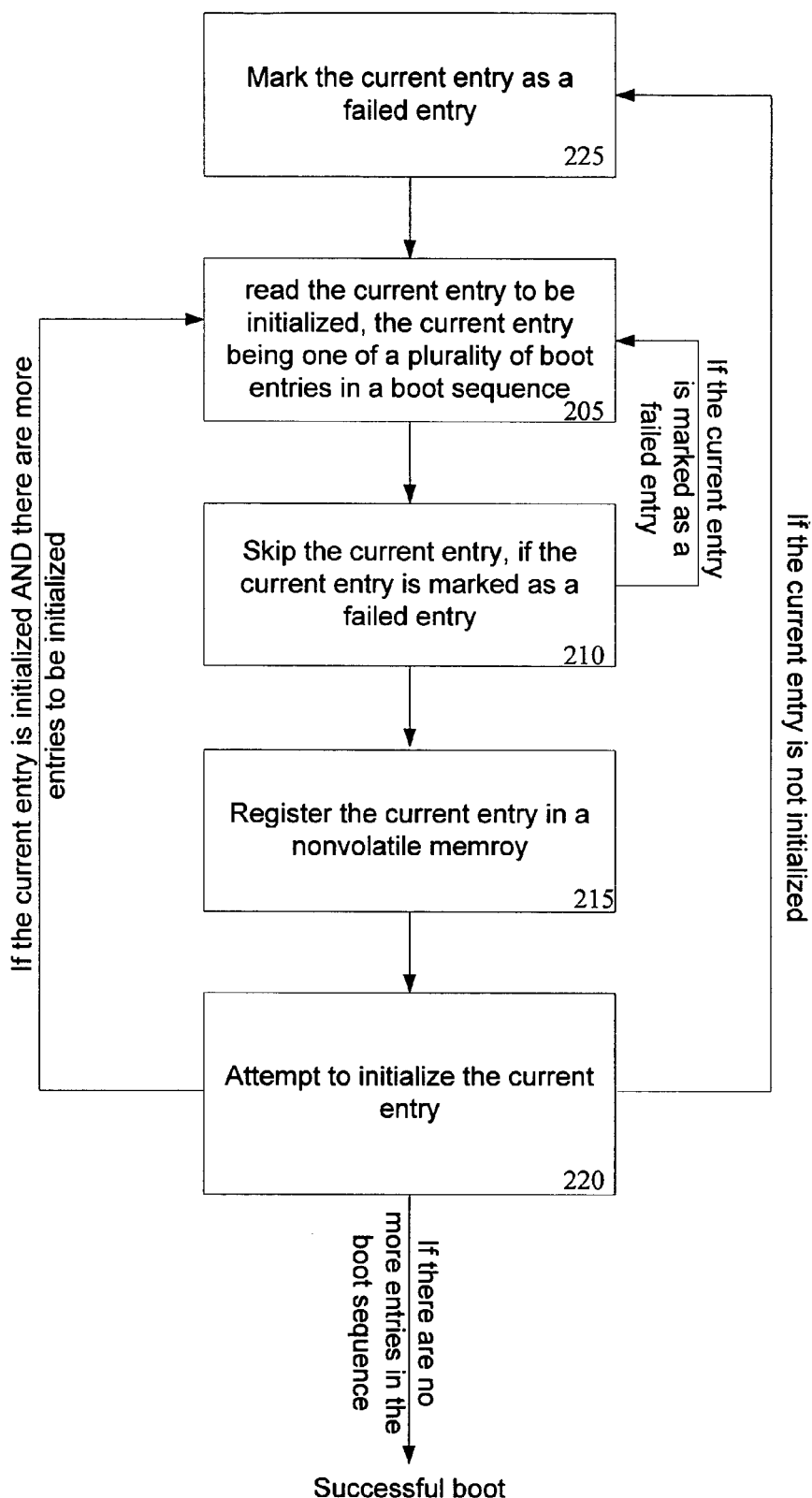
FIG. 2 illustrates an embodiment of a flow diagram for executing a boot sequence in a fault resilient platform.

FIG. 2 illustrates an embodiment of a flow diagram for executing a boot sequence in a fault resilient platform. Upon boot of a system, boot routines or entries in a boot sequence are typically serially executed. In block 205, upon execution of the boot sequence, the current boot entry to be initialized is determined/read. For example, reading the current boot entry includes reading the boot entries policy directives. The current boot entry is any one of a plurality of boot entries to be executed in a boot sequence. In fact, the current boot entry need not be contiguous or serially located to the previously executed entry.

If the current entry to be initialized is marked, then in block 210 the current entry is skipped. In one embodiment skipping comprises not executing the entry to be skipped and determining another entry to be initialized. In one embodiment, skipping is done by simply moving a pointer from one line of nonvolatile memory, where the current entry to be skipped is stored, to another line of the nonvolatile memory where another entry is located. In another example, upon detecting that the current entry is marked, the execution jumps from the current entry to another entry to be initialized, skipping the current entries initialization operations.

In contrast, if the current entry is not marked, then in block 215 the current entry is registered in a nonvolatile memory. As stated above, registering a boot routine or entry in a nonvolatile memory may comprise storing a reference to the entry, setting a flag referencing the entry, or storing some entry information in the nonvolatile memory. Examples of the nonvolatile memory or flash devices include an erasable programmable read only memory (EPROM), an electrically erasable programmable read only memory (EEPROM), and a programmable logic array (PLA).

In block 220, after registering the current entry, an attempt to initialize the current entry is made. An attempt to initialize the current entry includes executing at least some code associated with the entry. In fact, an attempt to detect a device may be considered an attempt to initialize the current entry. Furthermore, the actual execution of code to initialize a device or component is also an attempt to initialize a current entry. As another example of an attempt to initialize a current entry, code is executed to initially boot or load an operating system.

If the current entry is successfully initialized and there are no more entries to initialize then a successful boot has occurred. Additionally, if the current entry is initialized, but there are more entries to initialize, then another entry, i.e. the entry after the current entry, is read in a return to block 205 and the process repeats. In contrast, if the current entry fails to be initialized, the current entry may be marked in block 225. As referenced above, marking in block 225 takes on many forms, including marking upon a failure with the option of marking only if the entry is NOT essential and/or the entry failed a predefined number, N, times. N being any positive integer.

As a specific example, if N is simply one, then upon entering block 225 after a failure to initialize the current entry, the current entry is marked. However, if N is an integer greater than one, then in block 225, it is determined if the current failure is the Nth failure. If the current failure is less than the Nth failure, then the current entry is not marked. Alternatively, if it is the Nth failure the current entry is marked.

Figure 3:
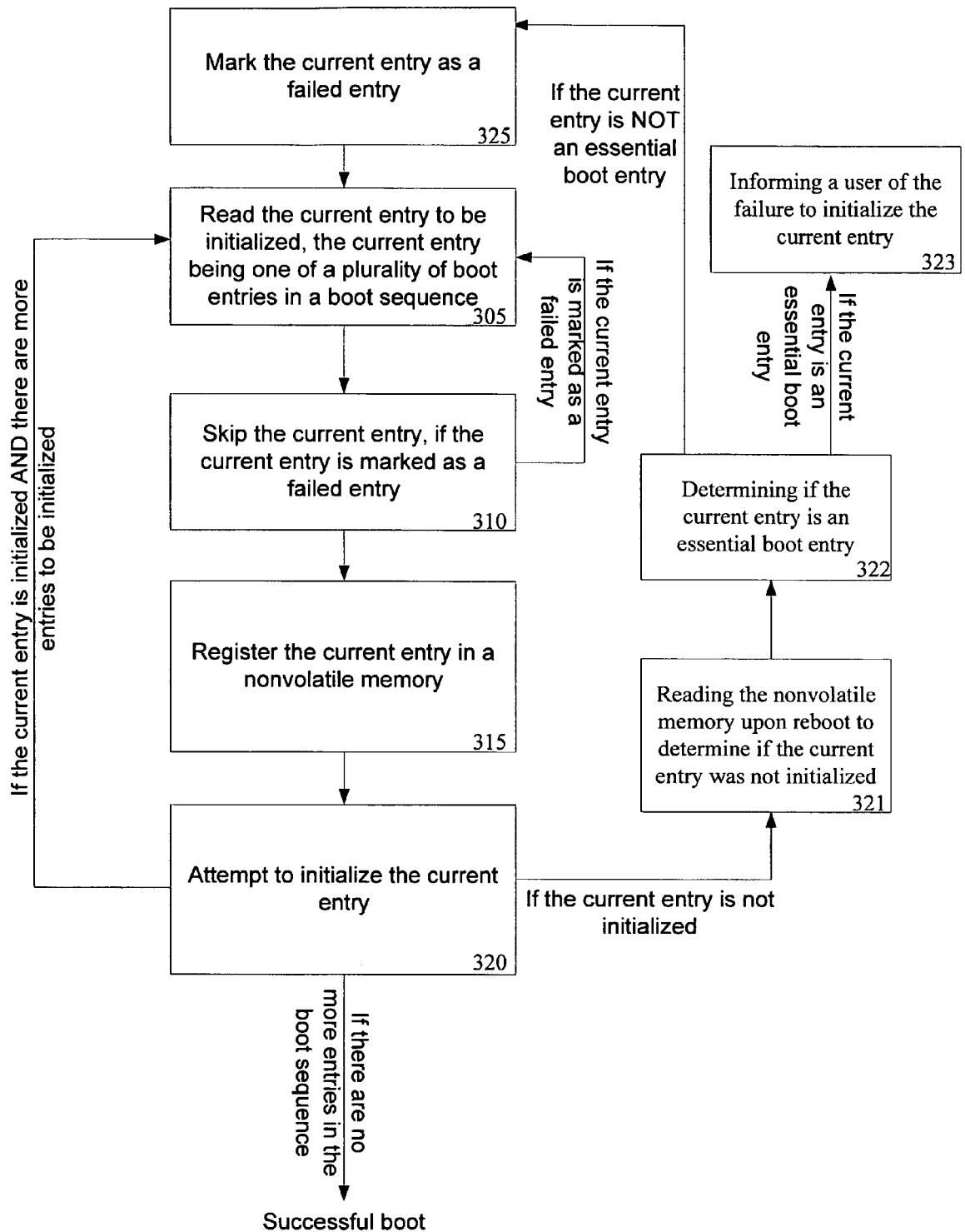
FIG. 3 illustrates another embodiment of a flow diagram for booting a fault resilient platform.

Next, FIG. 3 illustrates another embodiment of a flow diagram for booting a fault resilient learning BIOS. In block 225, shown in FIG. 2, marking may be done upon a recoverable or unrecoverable failure. In FIG. 3, an embodiment of marking the current entry as a failed entry upon a system hang or unrecoverable failure in initialization is illustrated in the flow between block 320 and 325.

As in FIG. 2, in block 305 the current entry to be initialized is read, in block 310 the current entry is skipped, if the current entry is marked as a failed entry, in block 315 the current entry is registered in a nonvolatile memory, and in block 320 an attempt to initialize the current entry is made. However, if the current entry is not initialized resulting in an unrecoverable failure, in block 321 the nonvolatile memory is read upon reboot to determine if the current entry was not initialized.

Since the current entry was the last entry registered in the nonvolatile memory, upon a reboot after a failure, it is possible to determine that the current entry was being executed when the system hang occurred. In block 322, it is determined whether the current entry is an essential boot entry. Whether a boot entry is essential is predefined by platform policy. If the current entry is an essential boot routine, then in block 323 the user is informed of the failure to initialize the entry last time, and may also be informed that it will not be marked, as it is an essential entry. Alternatively, if the current entry is not an essential boot entry, then in block 325 the current entry is marked as a failed entry. Note that in block 325, the marking of the current entry as a failed entry may still be conditional upon the number of times the entry has failed previously.

Figure 4:
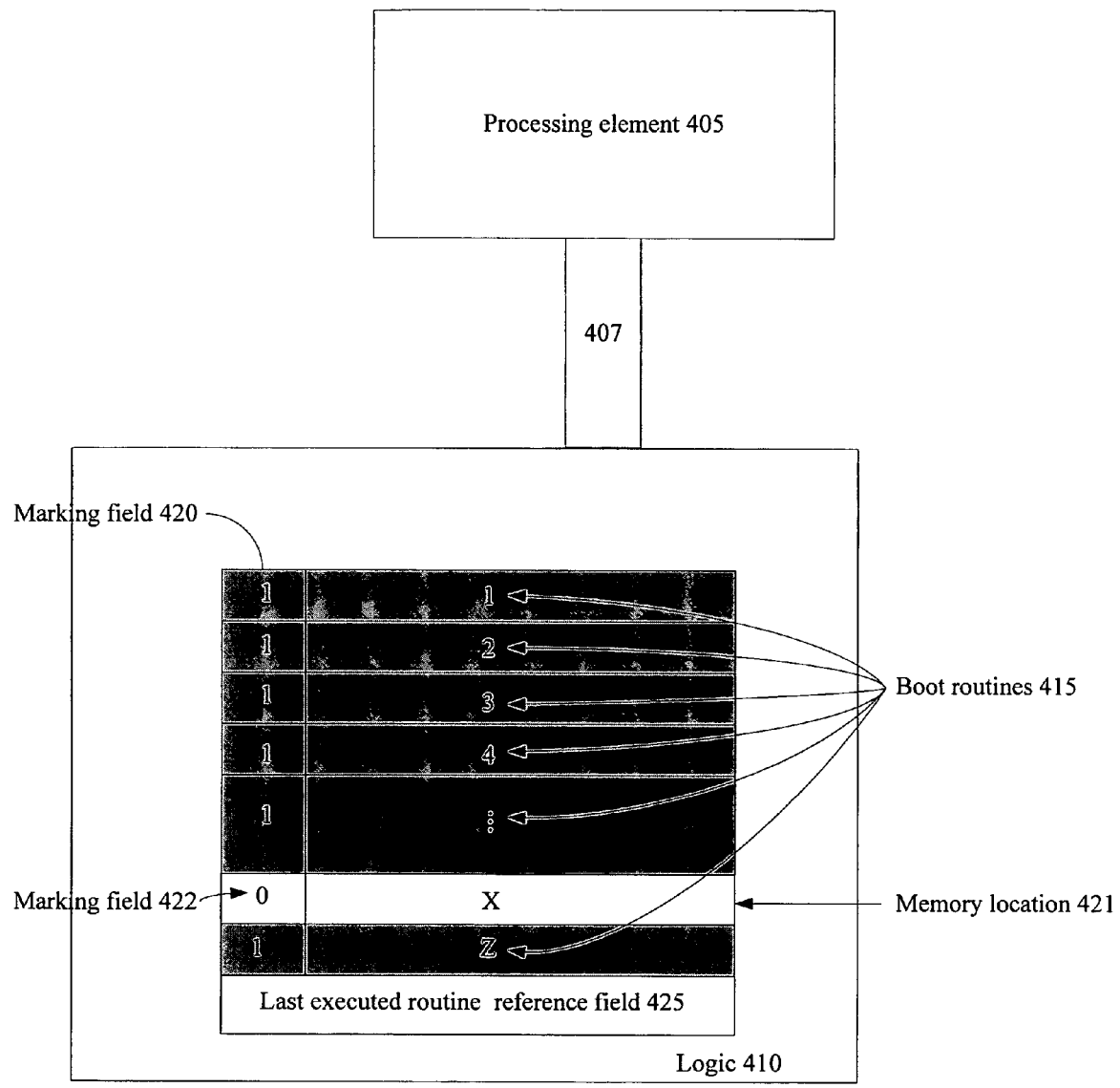
FIG. 4 illustrates an embodiment of a system having logic to store boot routines in a boot sequence, each of the boot routines capable of being marked.

Turning to FIG. 4 an embodiment of a fault resilient system comprising a processing element coupled to logic for storing boot routines, which are capable of being marked, is depicted. Examples of processing element 405 include an embedded controller, a microcontroller, a controller hub, a microprocessor, a co-processor, a digital signal processor, a processing cell, and an out-of-order parallel execution multi-threaded capable microprocessor.

Processing element 405 is coupled to logic 410 through interconnect 407, however, other components not shown, such as controller hubs, may be coupled between processing element 405 and logic 410. Logic 410 is any memory that is capable of storing code, which is not erasable by a loss of power to the platform. In one embodiment, logic 410 is a flash device used for storing BIOS code. Other examples of logic 410 include a nonvolatile memory, an erasable programmable read only memory (EPROM), an electrically erasable programmable read only memory (EEPROM), and a programmable logic array (PLA).

Logic 410 is to store a plurality of boot routines, such as routines 415, in a boot sequence and a last executed routine reference 425. The boot sequence may be stored in the order of execution or out of the order of execution for the boot sequence. Boot routines 415 are each capable of being marked in a marking field, such as marking field 420 associated with boot routine 1. Routine X, shown in memory location 421, is marked in marking field 422 as a failed routine. Consequently, upon execution of the boot sequence shown in FIG. 4, boot routine X will be skipped.

Logic 410 also stores last executed routine reference 425. In one embodiment, last executed routine reference 425 stores a reference to the physical address location of a boot routine. In this embodiment, when registering a boot routine in logic 410, the physical address of the boot routine to be executed, i.e. the current entry, is written to last executed routine reference 425. As another example, a numerical reference to the location of the current boot routine in the boot sequence is written to field 425. Any other known method of referencing a routine or group of code may be used in registering the current boot routine in last executed routine reference field 425.

Marking in FIG. 4 is shown by a bit associated with each boot routine, however, marking is not so limited. In fact, in simplified example where there are six boot routines, three bits are used to represent which boot routines are marked. Another embodiment for marking boot routines is illustrated in FIG. 5.

Figure 5:
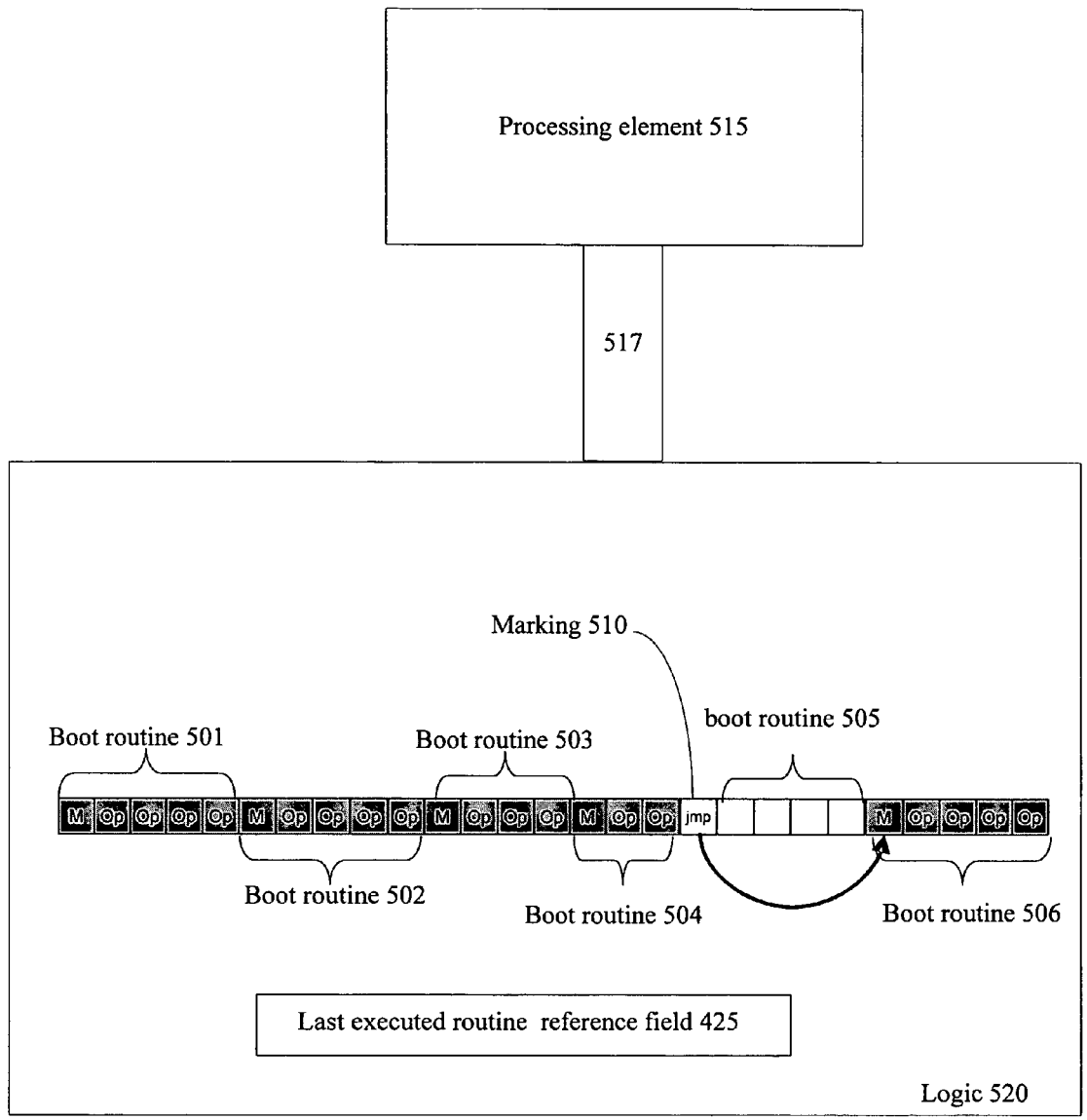
FIG. 5 illustrates another embodiment of a system having logic to store boot routines in a boot sequence.

In FIG. 5, a processing element and logic are still shown. In contrast to FIG. 4 though, logic 520 stores boot routines in an execute in place (XIP) architecture. Upon boot, processing element 515 executes instruction after instruction, starting at one physical address, executing each instruction in order of physical address. Unfortunately, in this architecture each opcode is blindly executed and no flag marking is easily implemented. Consequently, a pad operation before at the beginning of each boot routine is inserted. When a boot routine, such as boot routine 501 is not marked, the first opcode, represented by a M in FIG. 5, is simply a ghost opcode to continue execution. Alternatively, if a boot entry, such as boot routine 505, is marked, the marking instruction 510 is a jump operation, jumping the path of execution to boot routine 506, which is the next routine after skipped routine 505.

As can be seen from above fault resilient platforms may be designed, where a failure of a non-essential device upon pre-boot does not require extensive debug and a service call. In fact, boot of a platform persists by skipping the non-essential routines that have previously failed upon subsequent boots. Therefore, pre-boot configurations are adaptive and re-configured based on previous failures. Moreover, even if a boot routine that is failing is too essential to the platform to be skipped, by registering the current routine executed during a boot sequence, a user may be informed when a boot routine fails, instead of executing without knowledge of where the execution hangs.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   determining if a boot routine of a plurality of boot routines in a boot sequence failed upon an attempted execution of the boot routine in the boot sequence during a previous initialization of a system;
   determining if the boot routine is an essential boot routine;
   marking the boot routine in response to the boot routine failing during the attempted execution of the boot sequence during the previous initialization of the system and determining the boot routine is not an essential boot routine;
   not marking the boot routine in response to determining the boot routine is an essential boot routine; and
   not attempting execution of the boot routine upon a subsequent execution of the boot sequence for a subsequent initialization of the system in response to the boot routine being marked.

2. The method of claim 1, further comprising: not marking the boot routine in response to either the boot routine not failing during the attempted execution of the boot sequence or determining the boot routine is an essential boot routine.

3. The method of claim 2, wherein an essential boot routine is predefined by platform policy.

4. The method of claim 1, wherein determining if a boot routine, in a boot sequence, failed during the attempted execution of the boot sequence comprises:
   storing a reference to the boot routine in a currently executed field within a non-volatile memory;
   attempting to execute the boot routine;
   reading the currently executed field from the non-volatile memory upon a failure in the attempted execution of the boot sequence;
   determining that the boot routine failed during the attempted execution, if the currently executed field references the boot routine.

5. The method of claim 1, further comprising: informing a user of the failure of the boot routine.

6. The method of claim 1, further comprising: informing a user when execution of the boot routine is skipped upon the subsequent execution of the boot sequence.

7. The method of claim 1, further comprising marking the boot routine in response to the boot routine failing during the attempted execution of the boot sequence is an Nth time the boot routine failed during attempted execution of the boot sequence.

8. The method of claim 1, wherein the boot routine comprises code to initialize a device selected from a group consisting of an embedded controller, a processor, a processing element, a co-processor, a digital signal processor, a controller hub, a memory device, an add-in card, a sound device, a graphics device, a video device, a network device, a bus device, an interconnect bridge, a data storage device, an input device, an output device, a removable media device, and an externally coupled device.

9. A storage medium including program code stored on the storage medium which, when executed by a machine, causes the machine to perform the operations of:
   determining a current entry associated with a device to be initialized, the current entry being one of a plurality of boot entries in a boot sequence to be held in a non-volatile memory device;
   skipping execution of initialization code for the device associated with the current entry in response to the current entry being marked in the non-volatile memory device as a failed entry; and
   in response to the current entry not being marked as a failed entry,
      registering the current entry to be initialized in a non-volatile memory; and
      attempting to initialize the current entry, wherein in response to the device associated with the current entry failing to be initialized N times and the device being determined to be not essential, marking the current entry as a failed entry in the non-volatile memory device.

10. The article of manufacture of claim 9, further comprising determining if the device associated with the current entry has failed to be initialized N times, wherein N is any positive integer.

11. The article of manufacture of claim 10, wherein determining if the device associated with the current entry failed to be initialized N times comprises:
   reading an entry registered in the non-volatile memory after a system hang during execution of the boot sequence;
   determining that initialization of the device associated with the current entry failed in response to the entry registered in the non-volatile memory references the current entry; and
   determining that the device associated with the current entry failed to be initialized N times in response to a stored count indicating that attempted initialization of the current entry previously failed (N−1) times.

12. The article of manufacture of claim 9, wherein the current entry comprises the initialization code, when executed, to initialize the device associated with the current entry, wherein the device is selected from a group consisting of an embedded controller, a processor, a processing element, a co-processor, a digital signal processor, a controller hub, a memory device, an add-in card, a sound device, a graphics device, a video device, a network device, a bus device, an interconnect bridge, a data storage device, an input device, an output device, a removable media device, and an externally coupled device.

13. The article of manufacture of claim 12, wherein attempting to initialize the device associated with the current entry comprises executing code to initialize the device.

14. The article of manufacture of claim 9, wherein registering the current entry in the nonvolatile memory comprises: storing a reference to the current entry, which is to be executed, in the nonvolatile memory.

15. A system comprising:

a non-volatile memory to hold a plurality of boot routines in an execute in place (XIP) boot sequence and a last executed routine reference, wherein the non-volatile memory is to hold a marking entry before each boot routine, when set, to mark an immediately subsequent boot routine of the plurality of boot routines;

wherein the boot sequence, when executed with a processing element, causes the processing element to perform the operations of:

executing the plurality of boot routines in direct serial fashion utilizing physical addresses skipping execution of the immediately subsequent boot routine in the boot sequence and moving to a next boot routine in response to the marking entry before the immediately subsequent boot routine being set, registering a reference to the immediately subsequent boot routine as the last executed routine in the non-volatile memory and executing the immediately subsequent boot routine in response to the marking entry before the immediately subsequent boot routine not being set, and setting the marking entry before the immediately subsequent boot routine in response to execution of the immediately subsequent boot routine failing.

16. The system of claim 15, wherein the processing element is selected from a group consisting of an embedded controller, a microcontroller, a controller hub, a microprocessor, a co-processor, a digital signal processor, a processing cell, and an out-of-order multi-thread capable microprocessor.

17. The system of claim 15, wherein the logic is a memory device selected from a group consisting of a nonvolatile memory, an erasable programmable read only memory (EPROM), an electrically erasable programmable read only memory (EEPROM), and a programmable logic array (PLA).

18. The system of claim 17, wherein registering a reference to the immediately subsequent boot routine as the last executed routine in the non-volatile memory comprises storing a reference to the immediately subsequent boot routine in the non-volatile memory.

19. The system of claim 15, wherein marking the immediately subsequent boot routine comprises updating a field in the non-volatile memory associated with the current routine to a marked value.

20. The system of claim 15, wherein setting the marking entry before the immediately subsequent boot routine if further conditioned upon determining the immediately subsequent boot routine is not an essential boot routine.

* * * * *